United States Patent
Imanishi (10) Patent No.: US 12,399,482 B2
(45) Date of Patent: Aug. 26, 2025

(54) COMMAND GENERATION DEVICE AND NON-TRANSITORY COMPUTER-READABLE MEDIUM STORING A COMPUTER PROGRAM

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 72 days.

(21) Appl. No.: 18/547,857

(22) PCT Filed: Mar. 2, 2022

(86) PCT No.: PCT/JP2022/008788
§ 371 (c)(1),
(2) Date: Aug. 24, 2023

(87) PCT Pub. No.: WO2022/186255
PCT Pub. Date: Sep. 9, 2022

(65) Prior Publication Data
US 2024/0134342 A1 Apr. 25, 2024
US 2024/0231308 A9 Jul. 11, 2024

(30) Foreign Application Priority Data
Mar. 5, 2021 (JP) .................. 2021-035417

(51) Int. Cl.
*B25J 9/16* (2006.01)
*B25J 9/00* (2006.01)
*G05B 19/4093* (2006.01)

(52) U.S. Cl.
CPC ........ *G05B 19/4093* (2013.01); *B25J 9/0081* (2013.01); *G05B 2219/39134* (2013.01)

(58) Field of Classification Search
CPC ..... B25J 9/0081; B25J 9/1656; G05B 19/408; G05B 2219/39134
See application file for complete search history.

(56) References Cited

U.S. PATENT DOCUMENTS

2014/0364989 A1* 12/2014 Hosaka ............ G05B 19/41825
901/50
2018/0333846 A1* 11/2018 Tarui ...................... B25J 11/005
(Continued)

FOREIGN PATENT DOCUMENTS

JP 5752179 B2 7/2015
JP 2018-195055 A 12/2018
(Continued)

OTHER PUBLICATIONS

International Search Report issued in PCT/JP2022/008788; mailed May 24, 2022.

*Primary Examiner* — Dale Moyer
(74) *Attorney, Agent, or Firm* — Studebaker Brackett PLLC (57) ABSTRACT

Provided are a command generation device and a computer program with which a robot numerical value control command can be generated without the need for consideration of coordinate values and configuration information. A numerical value control device 2 is provided with a robot numerical value control command generation unit 22 that generates a robot numerical value control command for a robot in accordance with a numerical value control program. The robot numerical value control command generation unit 22 generates the robot numerical value control command on the basis of: at least one of a motion type of a robot 30, a motion speed of the robot 30, a positioning type of the robot 30, and a coordinate value type of the robot 30; coordinate values at a robot teaching point acquired on the basis of the coordinate (Continued)

value type of the robot 30; and configuration information relating to the robot 30 at the robot teaching point.

5 Claims, 8 Drawing Sheets

(56) References Cited

U.S. PATENT DOCUMENTS

2020/0316775 A1* 10/2020 Ooshima ................ G05B 19/19
2022/0011754 A1* 1/2022 Sagasaki ................ B25J 9/1658

FOREIGN PATENT DOCUMENTS

JP 2020-170356 A 10/2020
WO 2020/144772 A1 7/2020

* cited by examiner

COMMAND GENERATION DEVICE AND NON-TRANSITORY COMPUTER-READABLE MEDIUM STORING A COMPUTER PROGRAM

TECHNICAL FIELD

The present disclosure relates to a command generation device and a non-transitory computer-readable medium storing a computer program.

BACKGROUND ART

In recent years, in order to promote automation in the field of machining, there has been demanded a numerical control system that controls operation of a machine tool that machines a workpiece and operation of a robot provided in the vicinity of the machine tool in conjunction with each other (see, e.g., Patent Document 1).

Generally, a numerical control program for controlling the machine tool and a robot program for controlling the robot are different from each other in a program language. For this reason, in order to operate the machine tool and the robot in conjunction with each other, an operator needs to be familiar with both the numerical control program and the robot program.

Patent Document 1: Japanese Patent No. 5752179

DISCLOSURE OF THE INVENTION

Problems to be Solved by the Invention

Particularly, there is a problem that when operation of the robot is described in the numerical control program, a coordinate value on a coordinate system, such as an orthogonal coordinate system or an each-axis coordinate system, normally used for robot control cannot be intuitively input. Moreover, robot configuration information with which a machine tool user is not familiar needs to be specified, and for this reason, there is a problem that a robot operation program cannot be easily created in a machine tool language.

The present disclosure is intended to provide a command generation device and a non-transitory computer-readable medium storing a computer program capable of generating a robot numerical control command without considering a coordinate value and configuration information.

Means for Solving the Problems

One aspect of the present disclosure is a command generation device including a robot numerical control command generation unit that generates a robot numerical control command for a robot according to a numerical control program. The robot numerical control command generation unit generates the robot numerical control command based on: at least one of the operation type of the robot, the operation speed of the robot, the positioning type of the robot, or the coordinate value type of the robot; a coordinate value of a robot teaching point acquired based on the coordinate value type of the robot; and configuration information relating to the robot at the robot teaching point.

Another aspect of the present disclosure is a non-transitory computer-readable medium storing a computer program causing a computer to execute a step of generating a robot numerical control command for a robot according to a numerical control program based on: at least one of the operation type of the robot, the operation speed of the robot, the positioning type of the robot, or the coordinate value type of the robot; a coordinate value of a robot teaching point acquired based on the coordinate value type of the robot; and configuration information relating to the robot at the robot teaching point.

According to the present invention, the command generation device and a non-transitory computer-readable medium storing a computer program capable of generating the robot numerical control command without considering the coordinate value and the configuration information can be provided.

PREFERRED MODE FOR CARRYING OUT THE INVENTION

Hereinafter, one embodiment of the present disclosure will be described in detail with reference to the drawings.

Figure 1:
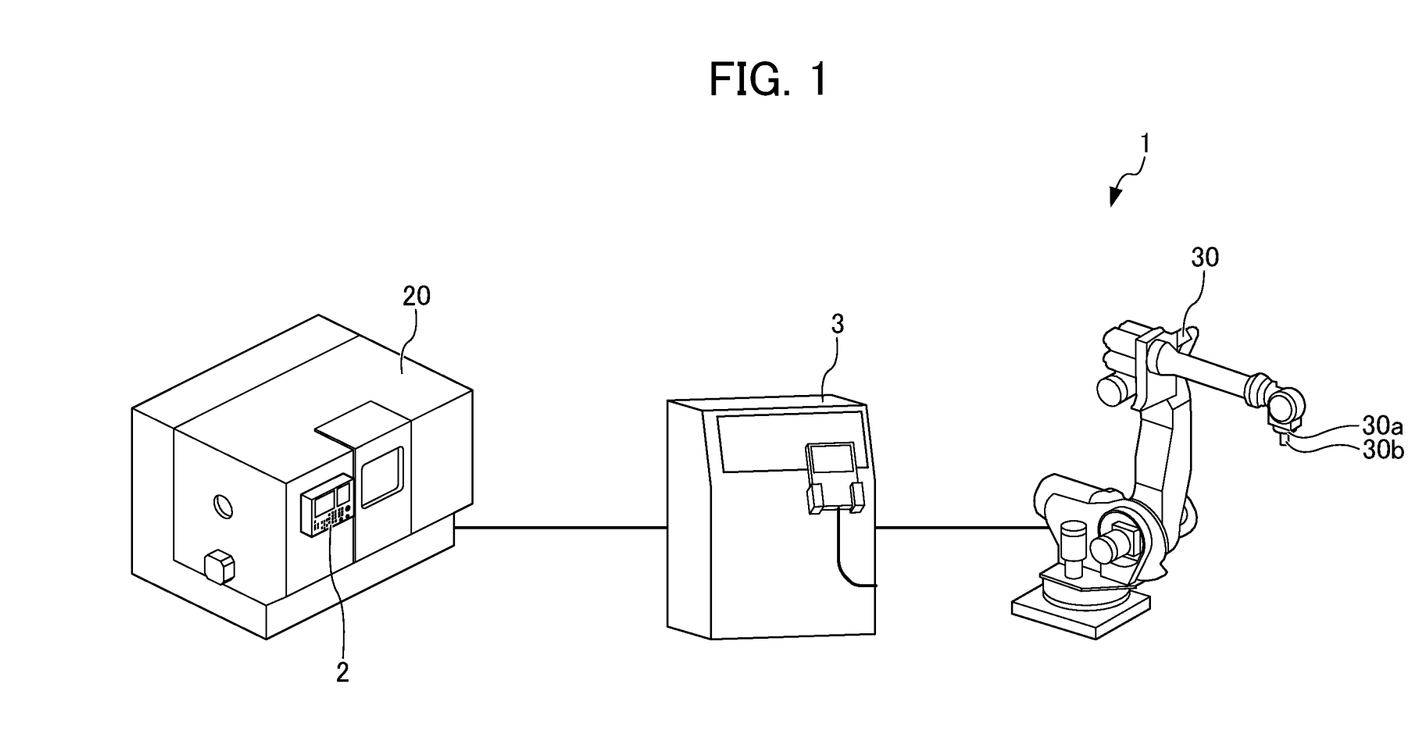
FIG. 1 is a schematic view of a numerical control system according to one embodiment of the present disclosure.

FIG. 1 is a schematic view of a numerical control system 1 according to one embodiment of the present disclosure.

The numerical control system 1 includes a numerical control device (CNC) 2 that controls a machine tool 20 and a robot control device 3 that is communicably connected to the numerical control device 2 and controls a robot 30 provided in the vicinity of the machine tool 20. Using the numerical control device 2 and the robot control device 3 communicably connected to each other, the numerical control system 1 according to the present embodiment controls operation of the machine tool 20 and the robot 30 in conjunction with each other.

The numerical control device 2 generates, according to a predetermined numerical control program, a machine tool command signal which is a command for the machine tool 20 and a robot command signal which is a command for the robot 30, and transmits the machine tool command signal and the robot command signal to the machine tool 20 and the robot control device 3. The robot control device 3 controls operation of the robot 30 according to the robot command signal transmitted from the numerical control device 2.

The machine tool 20 machines a not-shown workpiece according to the machine tool command signal transmitted from the numerical control device 2. The machine tool 20 is, but not limited to, a lathe, a drill press, a milling machine, a grinder, a laser beam machine, or an injection molding machine, for example.

The robot 30 operates under the control of the robot control device 3, and for example, executes a predetermined work on the workpiece machined inside the machine tool 20 such as a lathe. The robot 30 is, for example, an articulated robot, and a tool 30b for gripping, machining, or inspecting the workpiece is attached to an arm tip end portion 30a of the robot 30. Hereinafter, a case where the robot 30 is a six-axis articulated robot will be described, but the present disclosure is not limited to this case. Also, the case where the robot 30 is the six-axis articulated robot will be described hereinafter, but the number of axes is not limited to this case.

Figure 2:
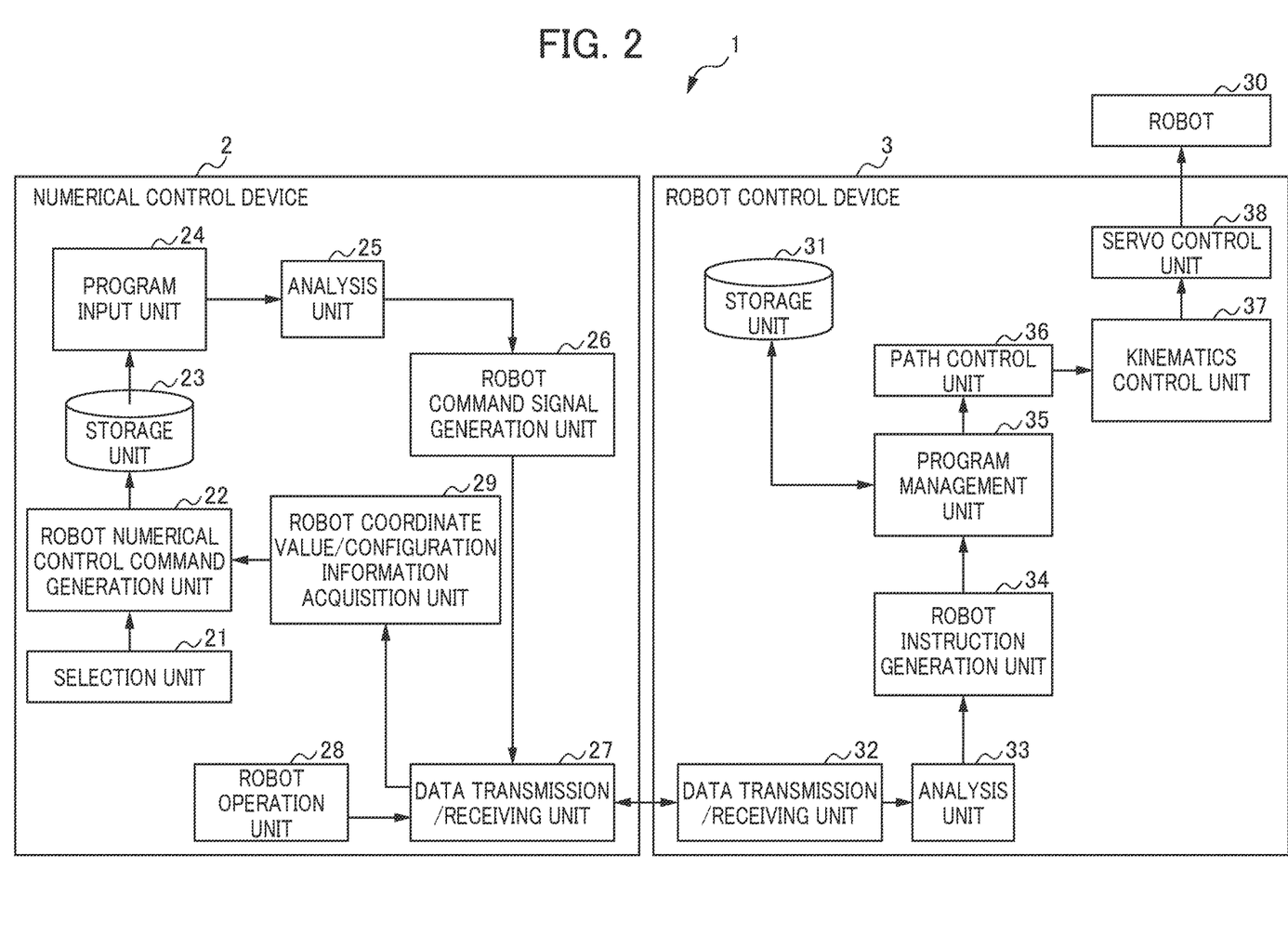
FIG. 2 is a functional block diagram of a numerical control device and a robot control device according to one embodiment of the present disclosure.

FIG. 2 is a functional block diagram of the numerical control device 2 and the robot control device 3 according to one embodiment of the present disclosure.

In the present embodiment, a command generation device of the present disclosure that generates a robot numerical control command for the robot according to the numerical control program is provided in the numerical control device 2, but the present disclosure is not limited to above. For example, the command generation device of the present disclosure may be provided in a personal computer. Hereinafter, an example where the command generation device of the present disclosure is provided in the numerical control device 2 will be described.

Each of the numerical control device 2 and the robot control device 3 is a computer with hardware including, e.g., an arithmetic processing section such as a central processing unit (CPU), an auxiliary storage section that stores various computer programs, such as a hard disk drive (HDD) or a solid state drive (SSD), a main storage section that stores data temporarily required for execution of the computer programs by the arithmetic processing section, such as a random access memory (RAM), an operation section used by an operator to perform various types of operation, such as a keyboard, and a display section that displays various types of information for the operator, such as a display. The numerical control device 2 and the robot control device 3 can exchange various signals via, e.g., the Ethernet (registered trademark).

First, a detailed configuration of the numerical control device 2 will be described. The numerical control device 2 implements, by the above-described hardware configuration, a machine tool control function of controlling operation of the machine tool 20 and a function of generating the robot command signal for controlling operation of the robot 30 about the control axis thereof. Specifically, the numerical control device 2 implements various functions such as a selection unit 21, a robot numerical control command generation unit 22, a storage unit 23, a program input unit 24, an analysis unit 25, a robot command signal generation unit 26, a data transmission/receiving unit 27, a robot operation unit 28, and a robot coordinate value/configuration information acquisition unit 29.

The selection unit 21 selects at least one of the operation type of the robot 30, the operation speed of the robot 30, the positioning type of the robot 30, or the coordinate value type of the robot 30. More specifically, the selection unit 21 selects, according to input operation by the operator, at least one of the operation type of the robot 30, the operation speed of the robot 30, the positioning type of the robot 30, or the coordinate value type of the robot 30. Moreover, the selection unit 21 outputs a selection result to the robot numerical control command generation unit 22.

Specifically, the selection unit 21 selects and specifies, according to input made by the input operation by the operator, any of each-axis operation, linear operation, and arc operation as the operation type of the robot 30. Here, the each-axis operation is an operation type in which each joint of the robot 30 operates about each axis without cooperating with each other. The linear operation is an operation type in which the arm tip end portion 30a operates such that a movement route of the tool 30b attached to the arm tip end portion 30a of the robot 30 is a linear route. The arc operation is an operation type in which the arm tip end portion 30a operates such that the movement route of the tool 30b attached to the arm tip end portion 30a of the robot 30 is an arc route.

The selection unit 21 selects and specifies, according to input made by the input operation by the operator, any robot coordinate system coordinate value of an each-axis coordinate value and an orthogonal coordinate value as the coordinate value type of the robot 30. When the selection unit 21 selects a robot coordinate system, the later-described robot coordinate value/configuration information acquisition unit 29 acquires a coordinate value of a teaching point of the robot 30 and configuration information relating to the robot 30 based on the selected coordinate system.

Here, the robot coordinate system is a coordinate system having, as an origin, a reference point set on the robot 30 or at an arbitrary position in the vicinity of the robot 30. Hereinafter, a case where the robot coordinate system is different from a machine tool coordinate system will be described, but the present disclosure is not limited to this case. The robot coordinate system may be coincident with the machine tool coordinate system. In other words, the origin or coordinate axis direction of the robot coordinate system may be coincident with the origin or coordinate axis direction of the machine tool coordinate system.

The robot coordinate system is switchable between two or more coordinate formats with different control axes. More specifically, the position and posture of a control point of the robot 30 can be specified by an orthogonal coordinate format or an each-axis coordinate format in the numerical control program.

In the each-axis coordinate format, the position and posture of the control point of the robot 30 is specified by the total of six real numbers of coordinate values having, as components, rotation angle values (J1, J2, J3, J4, J5, J6) of six joints of the robot 30.

In the orthogonal coordinate format, the position and posture of the control point of the robot 30 is specified by the total of six real numbers of coordinate values having, as components, three coordinate values (X, Y, Z) along three orthogonal coordinate axes and three rotation angle values (A, B, C) about each orthogonal coordinate axis.

In the each-axis coordinate format, the rotation angle of each joint of the robot 30 is directly specified, and therefore, shaft arrangement of each arm or wrist of the robot 30 and the rotation number of a joint rotatable 360 degrees or more (hereinafter, collectively referred to as the "configuration of the robot 30") are also uniquely set. On the other hand, in the orthogonal coordinate format, the position and posture of the control point of the robot 30 are specified by the six coordinate values (X, Y, Z, A, B, C), and therefore, the configuration of the robot 30 cannot be uniquely set. Thus, in the numerical control program for the robot, the configuration of the robot 30 can be specified by a configuration value P which is a predetermined-number-digit integer. Thus, the position and posture of the control point of the robot 30 and the configuration of the robot 30 are represented by the six coordinate values (J1, J2, J3, J4, J5, J6) in the each-axis coordinate format, and are represented by the six coordinate values and the one configuration value (X, Y, Z, A, B, C, P) in the orthogonal coordinate format.

The selection unit 21 selects, according to input made by the input operation by the operator, any of positioning operation and smooth operation as the positioning type of the robot 30. Here, the positioning operation is a position type in which in a case where three points of a start point, a target point, and a subsequent point are set as teaching points of the robot 30, operation is performed through all these three points.

Figure 3:
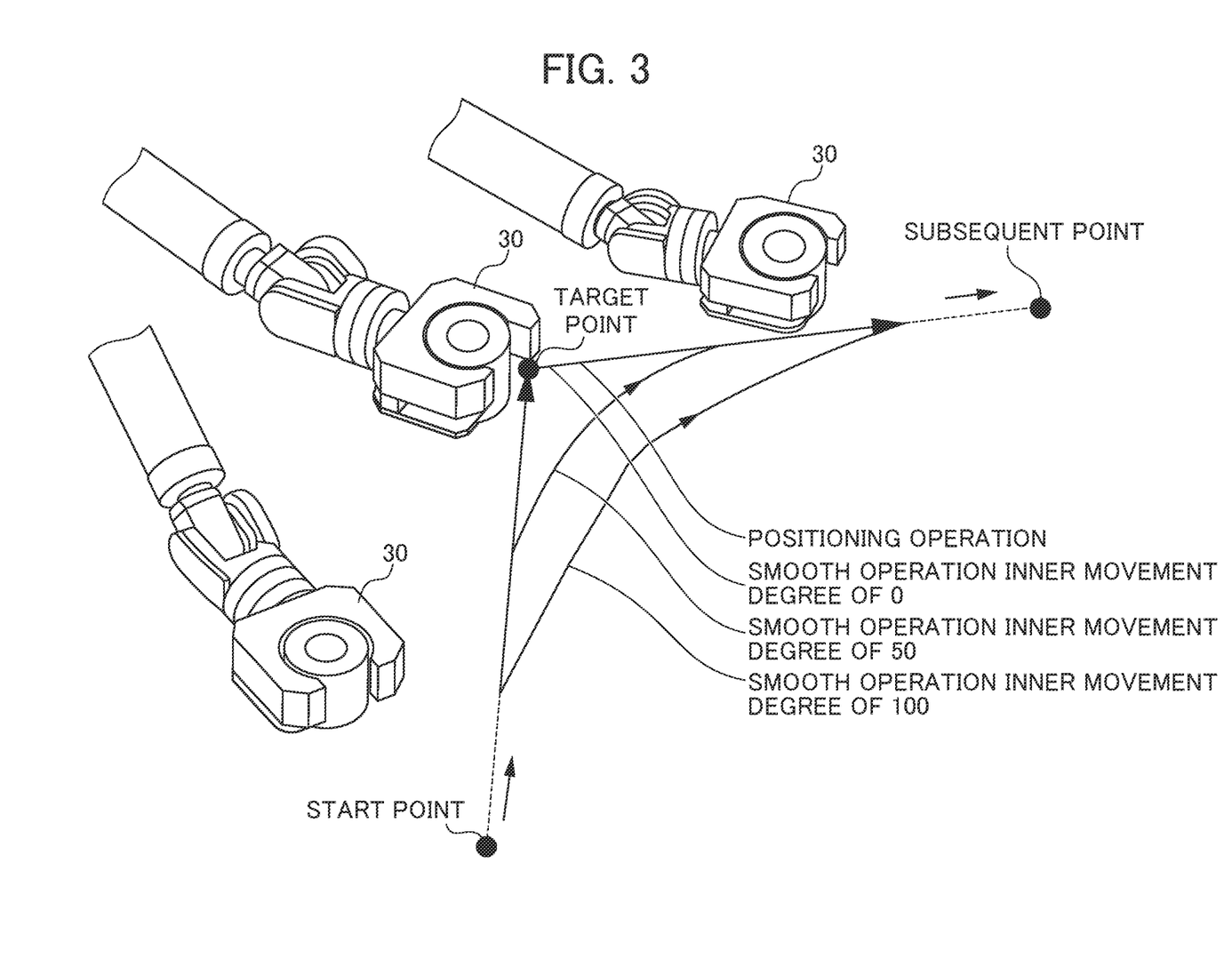
FIG. 3 is a view for describing smooth operation.

FIG. 3 is a view for describing the smooth operation. As shown in FIG. 3, the smooth operation is a positioning type in which in order to give priority to a cycle time, the robot 30 moves inside a path passing through three points of a start point, a target point, and a subsequent point and smoothly operates from the start point to the subsequent point without passing through the target point. In this smooth operation, an R-address is set as an inner movement degree. For example, as shown in FIG. 3, an inner movement degree of 0 indicates no inner movement, i.e., the same operation as the positioning operation, and a higher inner movement degree indicates a higher degree of inner movement and smoother operation. The R-address is input by the input operation by the operator.

The robot numerical control command generation unit 22 generates the robot numerical control command for the robot 30 according to the numerical control program. Specifically, the robot numerical control command generation unit 22 generates the robot numerical control command based on: at least one of the operation type of the robot 30, the operation speed of the robot 30, the positioning type of the robot 30, or the coordinate value type of the robot 30; the coordinate value of the robot teaching point acquired based on the coordinate value type of the robot 30; and the configuration information relating to the robot 30 at the robot teaching point.

The operation type of the robot 30, the operation speed of the robot 30, the positioning type of the robot 30, and the coordinate value type of the robot 30 are input, as the selection results obtained by selection by the selection unit 21 as described above, to the robot numerical control command generation unit 22. Moreover, the coordinate value of the robot teaching point acquired based on the selection result of the coordinate value type of the robot 30 and the configuration information relating to the robot 30 at the robot teaching point are acquired from the robot control device 3 by the later-described robot coordinate value/configuration information acquisition unit 29, and are input to the robot numerical control command generation unit 22. As described above, in the numerical control device 2 according to the present embodiment, the robot coordinate value and configuration information are automatically acquired by operation selection by the input operation by the operator. With this configuration, the robot numerical control command can be easily generated without the operator considering the robot coordinate value and configuration information.

The storage unit 23 has a program storage unit, a machine coordinate value storage unit, a robot coordinate value storage unit, and a robot teaching position storage unit although these units are not shown in the configuration.

The program storage unit stores a plurality of numerical control programs created based on operation by the operator, for example. More specifically, the program storage unit stores a numerical control program including a plurality of command blocks for the machine tool 20 for controlling operation of the machine tool 20, a plurality of command blocks for the robot 30 for controlling operation of the robot 30, etc. The numerical control program stored in the program storage unit is described in a known program language, such as G-code or M-code, for controlling operation of the machine tool.

The machine coordinate value storage unit stores machine coordinate values indicating the positions (i.e., the positions of a tool rest, a table, etc. of the machine tool 20) of various shafts of the machine tool 20 operating under the above-described numerical control program. Note that these machine coordinate values are defined under the machine tool coordinate system having, as the origin, a reference point set on the machine tool or at an arbitrary position in the vicinity of the machine tool 20. The machine coordinate value storage unit is sequentially updated such that the latest value of the machine coordinate value sequentially changing under the numerical control program is stored.

The robot coordinate value storage unit stores robot coordinate values indicating the position and posture of the control point (e.g., the arm tip end portion 30a of the robot 30) of the robot 30 under the control of the robot control device 3, i.e., the position of the robot 30 about each control axis. Note that these robot coordinate values are defined under the robot coordinate system different from the machine tool coordinate system as described above. The robot coordinate value storage unit is sequentially updated to the robot coordinate value acquired from the robot control device 3 by not-shown processing such that the latest value of the robot coordinate value sequentially changing under the numerical control program is stored.

The robot teaching position storage unit stores teaching positions, such as a start point and an end point, of the robot 30 input by the operator, specifically teaching positions of the robot 30 input via, e.g., a teaching pendant and teaching positions input via, e.g., a keyboard. The teaching positions of the robot 30 include a robot coordinate value indicating the position of the robot 30 about each control axis, and these robot coordinate values are defined under the robot coordinate system different from the machine tool coordinate system.

The program input unit 24 reads the numerical control program from the program storage unit, and sequentially inputs such a program to the analysis unit 25.

The analysis unit 25 analyzes, for each command block, a command type based on the numerical control program input from the program input unit 24, and outputs an analysis result to a not-shown machine tool control unit and the later-described robot command signal generation unit 26. More specifically, in a case where the command type of the command block is a command for the machine tool 20, the analysis unit 25 transmits such a command to the machine tool control unit. In a case where the command type of the command block is a command for the robot 30, the analysis unit 25 outputs such a command to the robot command signal generation unit 26.

The not-shown machine tool control unit generates a machine tool control signal for controlling operation of the machine tool 20 according to the analysis result transmitted from the analysis unit 25, and inputs such a signal to an actuator that drives various shafts of the machine tool 20. The machine tool 20 operates according to the machine tool control signal input from the machine tool control unit, thereby machining the not-shown workpiece. After having controlled operation of the machine tool 20 according to the numerical control program as described above, the machine tool control unit updates the machine coordinate value stored in the machine coordinate value storage unit to the latest machine coordinate value.

The robot command signal generation unit 26 generates the robot command signal according to the robot program which is one included in the programs stored in the storage unit 23 and analyzed by the analysis unit 25 as the command type of the command block being the command for the robot 30. The generated robot command signal includes a robot program activation command which is a trigger for activating a robot program stored in a storage unit 31 in the robot control device 3. The robot command signal generation unit 26 writes the generated robot command signal in the data transmission/receiving unit 27.

The data transmission/receiving unit 27 exchanges various commands and various types of data with a data transmission/receiving unit 32 of the robot control device 3. When the robot command signal generation unit 26 writes the robot command signal, the data transmission/receiving unit 27 transmits the robot command signal to the data transmission/receiving unit 32 of the robot control device 3. When the later-described robot operation unit 28 writes a positioning completion signal and the selection unit 21 selects operation, the data transmission/receiving unit 27 receives the coordinate value of the robot teaching point and the configuration information relating to the robot 30 based on the selected coordinate system from the robot control device 3, and outputs the coordinate value and the configuration information to the later-described robot coordinate value/configuration information acquisition unit 29.

When the operator manually operates the robot 30 to position the robot 30, the robot operation unit 28 writes the positioning completion signal in the later-described data transmission/receiving unit 27.

The robot coordinate value/configuration information acquisition unit 29 acquires, from the robot control device 3 that controls the robot 30, the coordinate value of the robot teaching point and the configuration information relating to the robot 30 based on the coordinate system selected by the selection unit 21 via the above-described data transmission/receiving unit 27. More specifically, when the above-described robot operation unit 28 writes the positioning completion signal in the data transmission/receiving unit 27 and the above-described selection unit 21 selects the robot coordinate system, the coordinate value of the teaching point of the robot 30 and the configuration information relating to the robot 30 based on the selected coordinate system are acquired by the robot coordinate value/configuration information acquisition unit 29.

Next, the configuration of the robot control device 3 will be described in detail. As shown in FIG. 2, the robot control device 3 implements, by the above-described hardware configuration, various functions such as the storage unit 31, the data transmission/receiving unit 32, an analysis unit 33, a robot instruction generation unit 34, a program management unit 35, a path control unit 36, a kinematics control unit 37, and a servo control unit 38. Specifically, using the storage unit 31, the data transmission/receiving unit 32, the analysis unit 33, the robot instruction generation unit 34, the program management unit 35, the path control unit 36, the kinematics control unit 37, and the servo control unit 38, the robot control device 3 controls operation of the robot 30 based on the command transmitted from the numerical control device 2.

The data transmission/receiving unit 32 receives the robot command signal transmitted from the data transmission/receiving unit 27 of the numerical control device 2. Moreover, the data transmission/receiving unit 32 sequentially outputs the received robot command signal to the analysis unit 33.

The analysis unit 33 analyzes the robot command signal input from the data transmission/receiving unit 32. Moreover, the analysis unit 33 outputs an analysis result to the robot instruction generation unit 34.

The robot instruction generation unit 34 generates a robot instruction according to the robot command signal based on the robot command signal analysis result input from the analysis unit 33. The robot instruction generation unit 34 outputs the generated robot instruction to the program management unit 35.

When receiving the robot instruction from the robot instruction generation unit 34, the program management unit 35 sequentially executes such an instruction, thereby generating an operation plan for the robot 30 according to the above-described robot command signal and outputting the operation plan to the path control unit 36.

Moreover, in a case where the robot instruction input from the robot instruction generation unit 34 is a block robot instruction, the program management unit 35 adds the input block robot instruction to the robot program stored in the storage unit 31. Accordingly, the robot program according to the robot command signal transmitted from the numerical control device 2 is generated and stored in the storage unit 31. The stored robot program is activated in response to a robot program activation command received as the robot instruction by the program management unit 35.

When receiving the operation plan from the program management unit 35, the path control unit 36 calculates time-series data on the control point of the robot 30, and outputs such data to the kinematics control unit 37.

The kinematics control unit 37 calculates the target angle of each joint of the robot 30 from the input time-series data, and outputs the target angle to the servo control unit 38.

The servo control unit 38 performs feedback control for each servomotor of the robot 30 such that the target angle input from the kinematics control unit 37 is achieved, thereby generating a robot control signal for the robot 30 and inputting such a signal to each servomotor of the robot 30.

Figure 4:
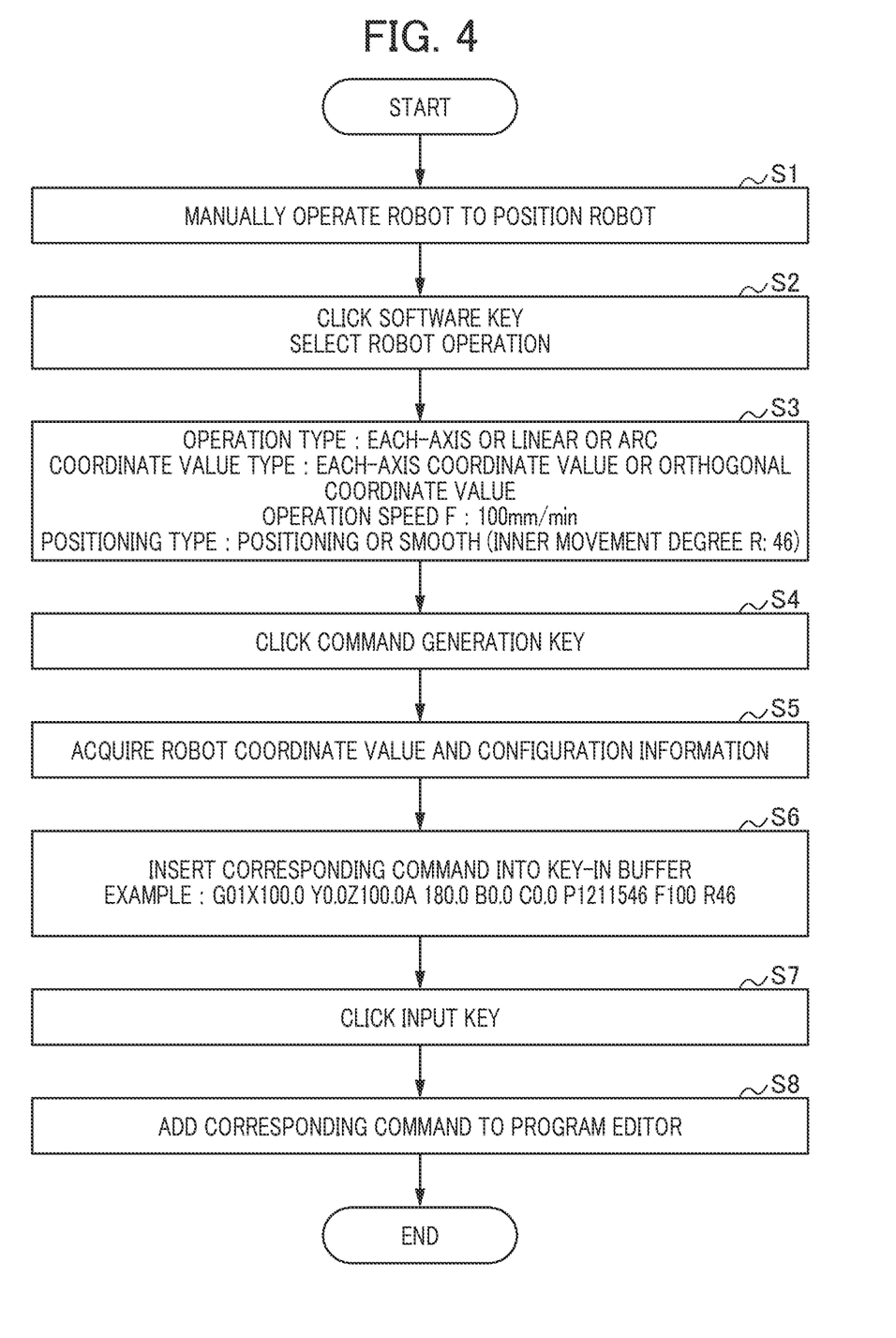
FIG. 4 is a flowchart showing the procedure of robot numerical control command generation processing.

Next, the procedure of robot numerical control command generation processing according to the present embodiment will be described in detail. FIG. 4 is a flowchart showing the procedure of the robot numerical control command generation processing.

In Step S1, the operator manually operates the robot 30, thereby positioning the robot 30. Thereafter, the processing proceeds to Step S2.

In Step S2, the operator clicks a software key on an operation screen of the numerical control device 2, thereby selecting robot operation. Specifically, the operator selects and inputs, by operation of the software key, e.g., the robot operation type to be processed in Step S3 later. Thereafter, the processing proceeds to Step S3.

Figure 5:
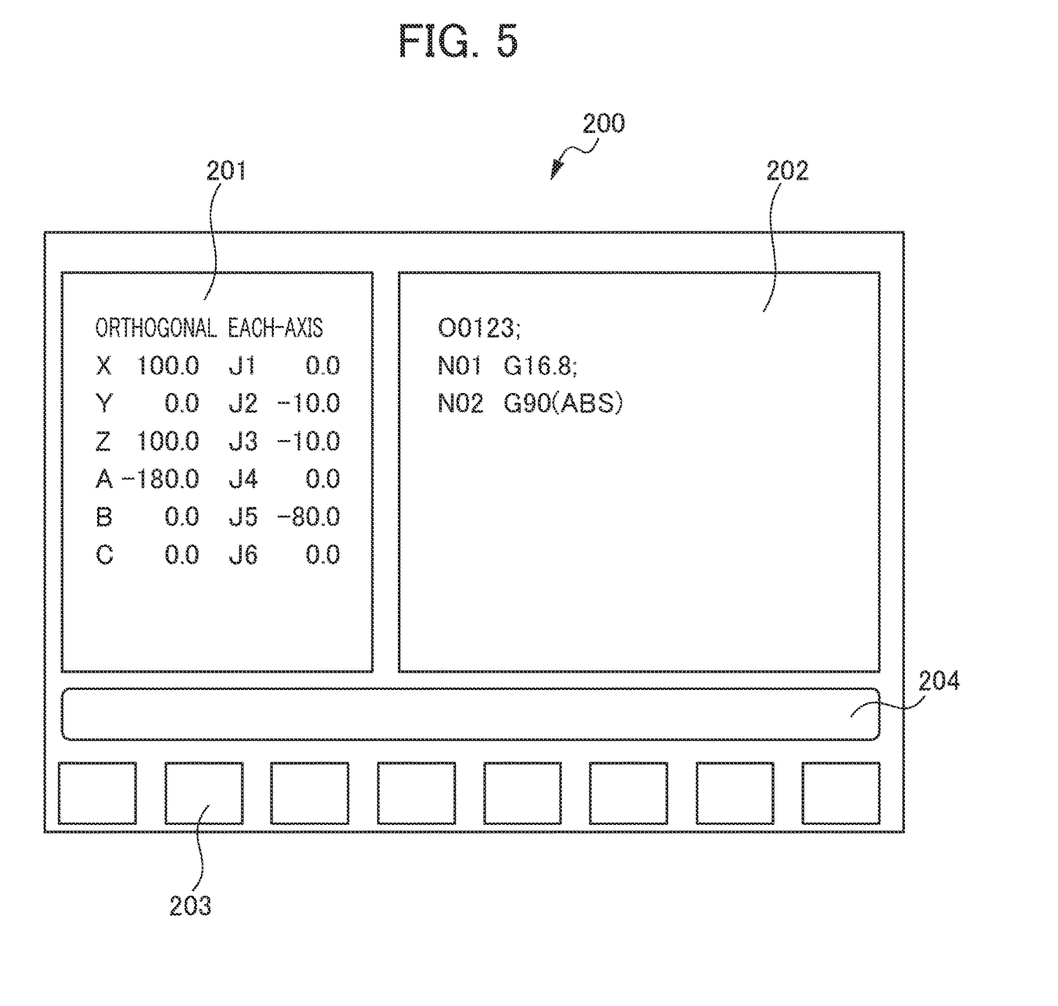
FIG. 5 is a view showing one example of an operation screen of the numerical control device according to one embodiment of the present disclosure.

FIG. 5 is a view showing one example of the operation screen 200 of the numerical control device 2 according to the present embodiment. As shown in FIG. 5, the operation screen 200 of the numerical control device 2 according to the present embodiment has a robot coordinate value display unit 201 that displays the robot coordinate values, a program editor unit 202 that displays and edits the robot numerical control command, software keys 203, and a key-in buffer 204 that temporarily saves and displays an input value. In Step S2 above, the operator clicks the plurality of software keys 203, thereby selecting and inputting the robot operation type etc.

In Step S3, robot operation selection processing is executed. Specifically, at least one of the operation type of the robot 30, the coordinate value type of the robot 30, the operation speed of the robot 30, or the positioning type of the robot 30 is selected. Hereinafter, the procedure of each of operation type selection processing for the robot 30, coordinate value type selection processing for the robot 30, and positioning type selection processing for the robot 30 will be described in detail with reference to FIGS. 6 to 8.

Figure 6:
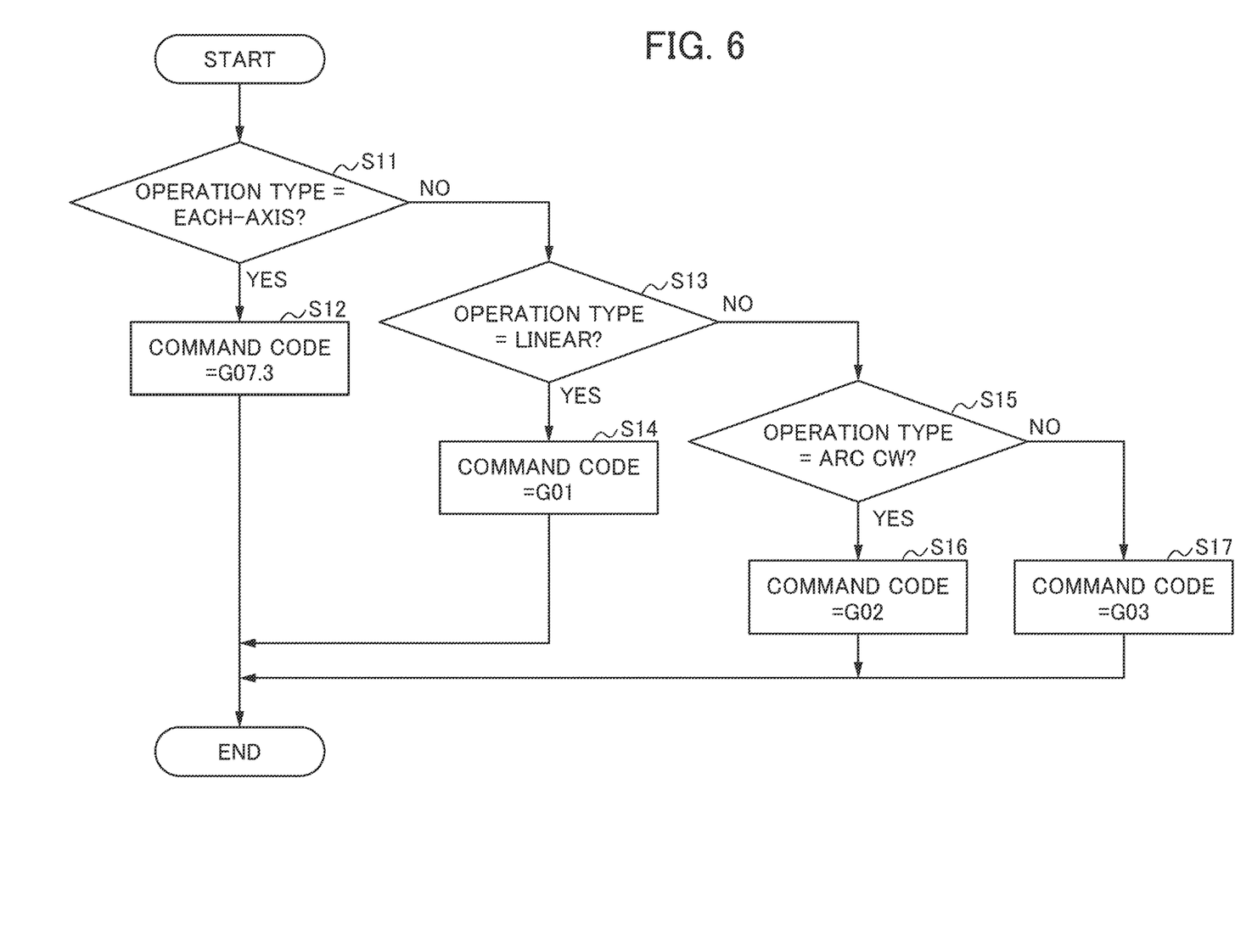
FIG. 6 is a flowchart showing the procedure of operation type selection processing.

FIG. 6 is a flowchart showing the procedure of the operation type selection processing. This processing flow is executed by the selection unit 21 according to operation of the software keys 203 by the operator. Moreover, this processing flow forms the subroutine of Step S3 in the above-described robot numerical control command generation processing.

In Step S11, it is determined whether or not the operation type of the robot 30 input by operation of the software keys 203 by the operator is the each-axis operation. If the answer is YES, the processing proceeds to Step S12, G07.3 is selected and specified as a command code, and this processing ends.

If the answer in Step S11 is NO, the processing proceeds to Step S13, and it is determined whether or not the operation type of the robot 30 input by operation of the software keys 203 by the operator is the linear operation. If the answer is YES, the processing proceeds to Step S14, G01 is selected and specified as the command code, and this processing ends.

If the answer in Step S13 is NO, the processing proceeds to Step S15, and it is determined whether or not the operation type of the robot 30 input by operation of the software keys 203 by the operator is clockwise CW operation of the arc operation. If the answer is YES, the processing proceeds to Step S16, G02 is selected and specified as the command code, and this processing ends.

If the answer in Step S15 is NO, the processing proceeds to Step S17. In this case, since it is determined that the operation type of the robot 30 input by operation of the software keys 203 by the operator is counterclockwise CCW operation of the arc operation, G03 is selected and specified as the command code, and this processing ends.

Figure 7:
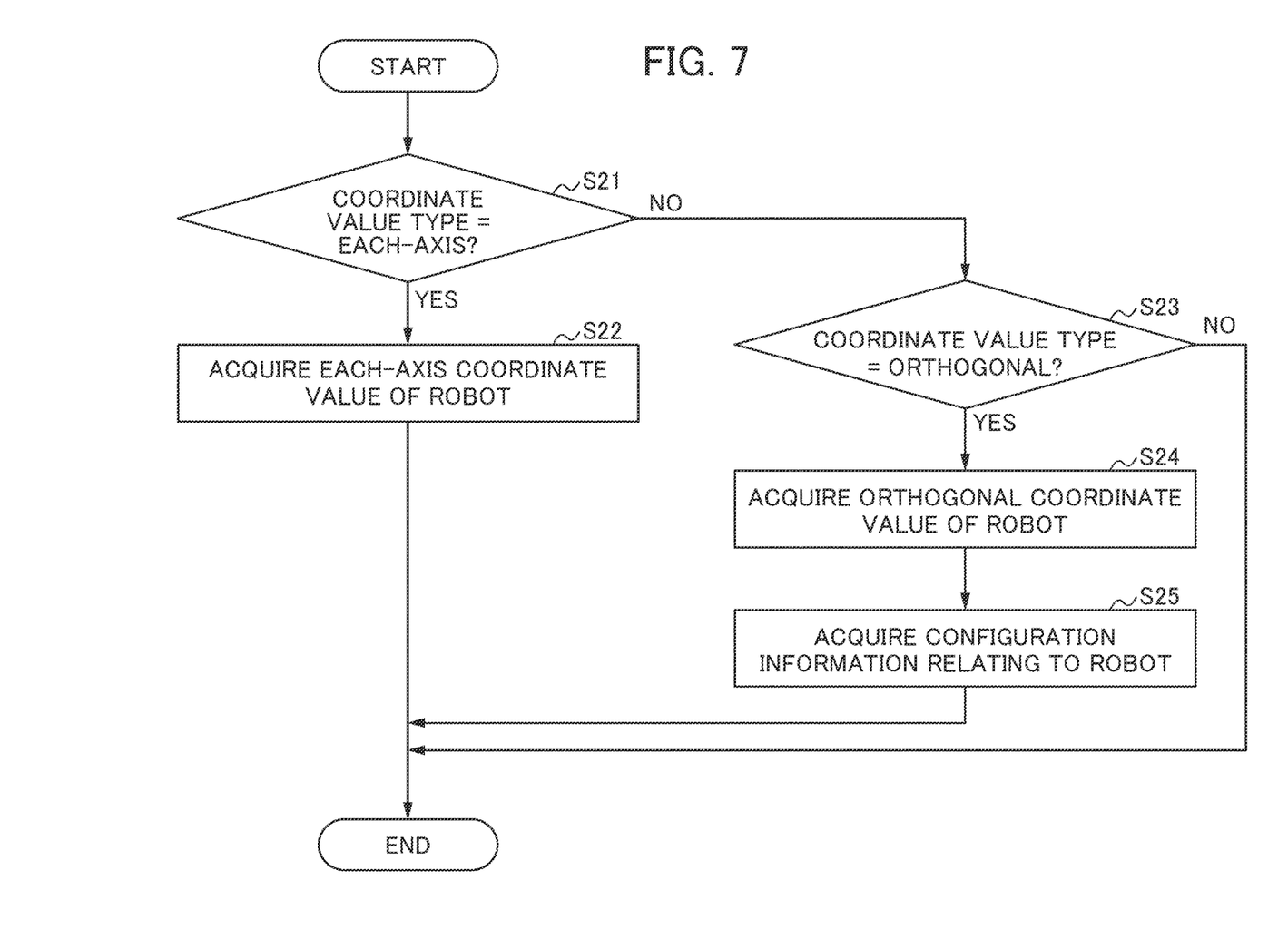
FIG. 7 is a flowchart showing the procedure of coordinate value type selection processing.

FIG. 7 is a flowchart showing the procedure of the coordinate value type selection processing. This processing flow is executed, as in the above-described operation type selection processing, by the selection unit 21 according to operation of the software keys 203 by the operator. Moreover, this processing flow forms the subroutine of Step S3 in the above-described robot numerical control command generation processing.

In Step S21, it is determined whether or not the coordinate value type input by operation of the software keys 203 by the operator is the each-axis coordinate value of the each-axis coordinate system. If the answer is YES, the processing proceeds to Step S22, and the robot coordinate value/configuration information acquisition unit 29 acquires the each-axis coordinate value of the teaching point of the robot 30 from the robot control device 3. The acquired each-axis coordinate value of the teaching point of the robot 30 is displayed on the robot coordinate value display unit 201 as shown in FIG. 5. Thereafter, this processing ends.

If the answer in Step S21 is NO, the processing proceeds to Step S23, and it is determined whether or not the coordinate value type input by operation of the software keys 203 by the operator is the orthogonal coordinate value of the orthogonal coordinate system. If the answer is YES, the processing proceeds to Step S24, and the robot coordinate value/configuration information acquisition unit 29 acquires the orthogonal coordinate value of the teaching point of the robot 30 from the robot control device 3. The acquired orthogonal coordinate value of the teaching point of the robot 30 is displayed on the robot coordinate value display unit 201 as shown in FIG. 5. Thereafter, the processing proceeds to Step S25.

In Step S25, since the coordinate value type is the orthogonal coordinate value and the position of the robot 30 is represented by the six coordinate values and the one configuration value (X, Y, Z, A, B, C, P) under the orthogonal coordinate system as described above, the configuration value P is acquired as the configuration information relating to the robot 30. Specifically, the robot coordinate value/configuration information acquisition unit 29 acquires the configuration value P of the teaching point of the robot 30 from the robot control device 3. The acquired configuration value P of the teaching point of the robot 30 is displayed on the robot coordinate value display unit 201. Thereafter, this processing ends.

If the answer in Step S23 is NO, there is no input of the coordinate value type by the operator, and therefore, this processing ends. In this case, the coordinate value type and coordinate value selected in the previous processing are effectively maintained as modal information.

Figure 8:
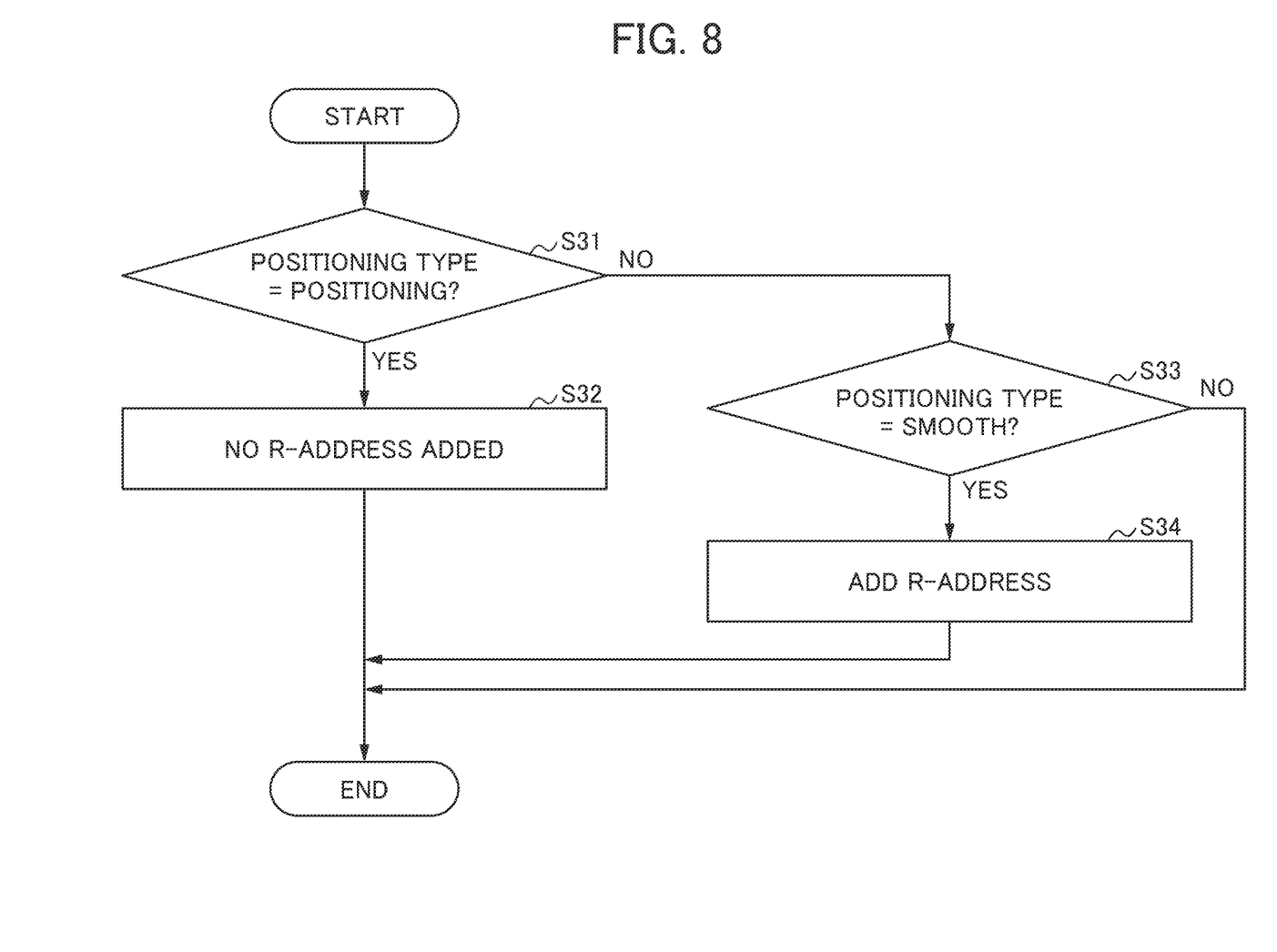
FIG. 8 is a flowchart showing the procedure of positioning type selection processing.

FIG. 8 is a flowchart showing the procedure of the positioning type selection processing. This processing flow is executed, as in the above-described operation type selection processing and coordinate value type selection processing, by the selection unit 21 according to operation of the software keys 203 by the operator. Moreover, this processing flow forms the subroutine of Step S3 in the above-described robot numerical control command generation processing.

In Step S31, it is determined whether or not the positioning type input by operation of the software keys 203 by the operator is the positioning operation. If the answer is YES, the processing proceeds to Step S32. Since this case is not the smooth operation and no R-address is required, this processing ends without the R-address value being additionally specified.

If the answer in Step S31 is NO, the processing proceeds to Step S33, and it is determined whether or not the positioning type input by operation of the software keys 203 by the operator is the smooth operation. If the answer is YES, the processing proceeds to Step S34, the R-address input by operation of the software keys 203 by the operator is additionally specified, and this processing ends. Note that FIG. 4 shows an example where an inner movement degree of R46 is specified as the R-address.

If the answer in Step S33 is NO, there is no input of the positioning type by the operator, and therefore, this processing ends. In this case, the positioning type and R-address selected in the previous processing are effectively maintained as modal information.

Note that the flowchart of operation speed selection processing for the robot 30 is not shown, but this processing flow is executed, as in the above-described operation type selection processing, coordinate value type selection processing, and positioning type selection processing, by the selection unit 21 according to operation of the software keys 203 by the operator. Moreover, this processing flow forms the subroutine of Step S3 in the above-described robot numerical control command generation processing. Specifically, in the operation speed selection processing, an operation speed F input by operation of the software keys 203 by the operator is selected and specified. Note that FIG. 4 shows an example where 100 mm/min is specified as the operation speed F.

Referring back to FIG. 4, in Step S4, the operator clicks a command generation key which is one of the software keys 203. Thereafter, the processing proceeds to Step S5.

In Step S5, the coordinate value of the teaching point of the robot 30 and the configuration information relating to the robot 30 are acquired. Specifically, the robot coordinate value/configuration information acquisition unit 29 acquires the coordinate value of the teaching point of the robot 30 and the configuration information relating to the robot 30 from the robot control device 3. Thereafter, the processing proceeds to Step S6.

In Step S6, a corresponding command is inserted into the key-in buffer 204. Here, the corresponding command is a robot numerical control command generated by the robot numerical control command generation unit 22 according to the conditions selected and specified in Steps S1 to S5 above. As shown as one example in FIG. 4, the robot numerical control command is specified as in the operation type (e.g., G01)+the coordinate value type (e.g., X100.0 Y0.0 Z100.0 A-180.0 B0.0 C0.0 P1211546)+the operation speed (e.g., F100)+the positioning type (e.g., R46). The robot numerical control command as the above-described corresponding command is temporarily saved in and displayed on the key-in buffer 204. Thereafter, the processing proceeds to Step S7.

Note that the configuration value P is defined as a seven-digit number as shown above as one example. Specifically, the configuration value P is represented by a seven-digit number in the order of the up and down of the wrist (1, 2), the right and left of the arm (1, 2), the up and down of the arm (1, 2), the front and back of the arm (1, 2), the rotation number about the J4-axis (4, 5, 6), the rotation number about the J5-axis (4, 5, 6), and the rotation number about the J6-axis (4, 5, 6). Thus, the configuration value P1211546 of one example above means that the wrist is up, the arm is right, the arm is up, the arm is front, the rotation number about the J4-axis is 5, the rotation number about the J5-axis is 4, and the rotation number about the J6-axis is 6.

Note that in Step S6, the corresponding command may be directly added to and displayed on the program editor unit 202 without being temporarily saved in and displayed on the key-in buffer 204.

In Step S7, the robot numerical control command temporarily saved in and displayed on the key-in buffer 204 is checked by the operator, and if there is no problem, the operator clicks an INPUT key which is one of the software keys 203. Thereafter, the processing proceeds to Step S8.

In Step S8, the robot numerical control command which is the corresponding command is added to a program editor in response to clicking of the INPUT key by the operator in Step S7. Accordingly, the robot numerical control command generated by this processing is displayed on the program editor unit 202. The operator operates the software keys 203 as necessary, thereby editing the robot numerical control command displayed on the program editor unit 202. In this manner, the robot numerical control command is generated, and this processing ends.

According to the present embodiment, the following advantageous effects are provided. According to the present embodiment, the robot numerical control command is generated based on: at least one of the operation type of the robot 30, the operation speed of the robot 30, the positioning type of the robot 30, or the coordinate value type of the robot 30; the coordinate value of the robot teaching point acquired based on the coordinate value type of the robot 30; and the configuration information relating to the robot 30 at the robot teaching point. With this configuration, the coordinate value in the coordinate system such as the orthogonal coordinate system or the each-axis coordinate system can be intuitively input, and the configuration information with which a machine tool user is not familiar is easily set. Thus, an operation program for the robot 30 can be easily created in a numerical control program language for the machine tool.

The present disclosure is not limited to the above-described embodiment, and various changes and modifications can be made. For example, in the above-described embodiment, the case where the present disclosure is implemented by the numerical control system 1 including the numerical control device 2 and the robot control device 3 has been described, but the present disclosure is not limited to this case. The present disclosure can also be implemented by a non-transitory computer-readable medium storing a computer program causing a computer to implement various functions of the numerical control device 2 and the robot control device 3.

In the above-described embodiment, any of the each-axis coordinate system and the orthogonal coordinate system is selected as the coordinate system for the robot 30, but the present disclosure is not limited to above. For example, a tool coordinate system can also be selected. Here, the tool coordinate system is a coordinate system in which the position of a tool tip end point (TCP) of the robot 30 and the posture of the tool are defined. The tool coordinate system relates to operation about a mechanical interface coordinate system (wrist flange surface) of the robot 30, and is set in such a manner that an offset value from the origin of the mechanical interface coordinate system and a rotation angle about each coordinate axis are set.

In the above-described embodiment, the robot coordinate value/configuration information acquisition unit 29 acquires the coordinate value of the robot teaching point and the configuration information relating to the robot 30 from the robot control device 3 that controls the robot 30, but the present disclosure is not limited to above. For example, the robot coordinate value/configuration information acquisition unit 29 may acquire the coordinate value and the configuration information from an offline programming device that creates the operation program for the robot 30 offline.

EXPLANATION OF REFERENCE NUMERALS

1 Numerical Control System
2 Numerical Control Device (Command Generation Device)
3 Robot Control Device
21 Selection Unit
22 Robot Numerical Control Command Generation Unit
23 Storage Unit
24 Program Input Unit
25 Analysis Unit
26 Robot Command Signal Generation Unit
27 Data Transmission/Receiving Unit
28 Robot Operation Unit
29 Robot Coordinate Value/Configuration Information Acquisition Unit
30 Robot
30a Arm Tip End Portion
30b Tool
31 Storage Unit
32 Data Transmission/Receiving Unit
33 Analysis Unit
34 Robot Instruction Generation Unit 35 Program Management Unit
36 Path Control Unit
37 Kinematics Control Unit
38 Servo Control Unit

The invention claimed is:

1. A command generation device comprising a processor that is configured to generate a robot numerical control command for a robot according to a numerical control program,
wherein the processor generates the robot numerical control command based on:
at least one of an operation type of the robot, an operation speed of the robot, a positioning type of the robot, or a coordinate value type of the robot;
a coordinate value of a robot teaching point acquired based on the coordinate value type of the robot; and
configuration information relating to the robot at the robot teaching point,
wherein the processor is configured to:
select at least one of the operation type of the robot, the operation speed of the robot, the positioning type of the robot, or the coordinate value type of the robot and output a selection result; and
acquire, based on a selected coordinate system, the coordinate value of the robot teaching point and the configuration information relating to the robot from a robot control device that controls the robot or an offline programming device that creates an operation program for the robot offline.

2. The command generation device according to claim 1, wherein the processor is configured to select any of each-axis operation, linear operation, and arc operation as the operation type of the robot.

3. The command generation device according to claim 1, wherein the processor is configured to select any of an each-axis coordinate value and an orthogonal coordinate value as the coordinate value type of the robot.

4. The command generation device according to claim 1, wherein the processor is configured to select any of positioning operation and smooth operation as the positioning type of the robot.

5. A non-transitory computer-readable medium storing a computer program causing a computer to generate a robot numerical control command for a robot according to a numerical control program based on:
at least one of an operation type of the robot, an operation speed of the robot, a positioning type of the robot, or a coordinate value type of the robot;
a coordinate value of a robot teaching point acquired based on the coordinate value type of the robot; and
configuration information relating to the robot at the robot teaching point,
wherein the computer program further causes the computer to:
select at least one of the operation type of the robot, the operation speed of the robot, the positioning type of the robot, or the coordinate value type of the robot and outputs a selection result, and
acquire, based on a selected coordinate system, the coordinate value of the robot teaching point and the configuration information relating to the robot that controls the robot or an offline programming device that creates an operation program for the robot offline.

* * * * *